(12) United States Patent
Ota et al.

(10) Patent No.: US 10,221,943 B2
(45) Date of Patent: Mar. 5, 2019

(54) CONTROL DEVICE FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Keisuke Ota, Toyota (JP); Ayumu Sagawa, Toyota (JP); Tomoya Iwami, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 15/648,558

(22) Filed: Jul. 13, 2017

(65) Prior Publication Data

US 2018/0023697 A1 Jan. 25, 2018

(30) Foreign Application Priority Data

Jul. 21, 2016 (JP) .................................. 2016-143527

(51) Int. Cl.
*F16H 61/04* (2006.01)
*F16H 61/682* (2006.01)
*F16H 61/686* (2006.01)
*F16H 3/66* (2006.01)

(52) U.S. Cl.
CPC ....... *F16H 61/0437* (2013.01); *F16H 61/682* (2013.01); *F16H 61/686* (2013.01); *F16H 3/666* (2013.01); *F16H 2061/0448* (2013.01); *F16H 2200/006* (2013.01); *F16H 2200/0069* (2013.01); *F16H 2200/201* (2013.01); *F16H 2200/2046* (2013.01); *F16H 2200/2097* (2013.01); *F16H 2306/14* (2013.01)

(58) Field of Classification Search
None
See application file for complete search history.

(56) References Cited

U.S. PATENT DOCUMENTS

| 6,270,444 | B1 * | 8/2001 | Tsutsui | F16H 61/0437 475/127 |
| 6,626,786 | B2 * | 9/2003 | Hayabuchi | F16H 61/0437 475/127 |
| 8,323,150 | B2 * | 12/2012 | Atmaram | F16H 61/061 477/133 |
| 9,017,217 | B2 * | 4/2015 | Norman | F16H 61/0213 477/98 |

(Continued)

FOREIGN PATENT DOCUMENTS

| JP | H10-89455 A | 4/1998 |
| JP | 2003-106438 A | 4/2003 |

(Continued)

*Primary Examiner* — Dirk Wright
(74) *Attorney, Agent, or Firm* — Oliff PLC

(57) ABSTRACT

When a power-on downshift via an intermediate shift stage accompanied by input switching control is required and a predetermined shift stage is a shift stage lower than the intermediate shift stage, an electronic control unit performs torque phase control in a torque phase control time shorter than the torque phase control time that is set when the predetermined shift stage is a shift stage higher than the intermediate shift stage. Accordingly, it is possible to complete disengagement of a disengagement-side element early and to suppress a rapid increase of an input shaft rotation speed due to a clutch torque remaining.

4 Claims, 8 Drawing Sheets

(56) References Cited

U.S. PATENT DOCUMENTS

| | | | |
|---|---|---|---|
| 9,200,701 B2* | 12/2015 | Sekii | F16H 61/0213 |
| 9,441,731 B2* | 9/2016 | Masunaga | B60W 10/06 |
| 9,482,341 B2* | 11/2016 | Kondo | F16H 61/061 |
| 2015/0260280 A1 | 9/2015 | Masunaga et al. | |
| 2016/0017995 A1 | 1/2016 | Kondo et al. | |

FOREIGN PATENT DOCUMENTS

| | | |
|---|---|---|
| JP | 2011-163406 A | 8/2011 |
| JP | 2012-251581 A | 12/2012 |
| JP | 2014-137137 A | 7/2014 |
| JP | 2015-148322 A | 8/2015 |
| JP | 2016-099000 A | 5/2016 |
| WO | 2014/141368 A1 | 9/2014 |

\* cited by examiner

FIG. 3

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

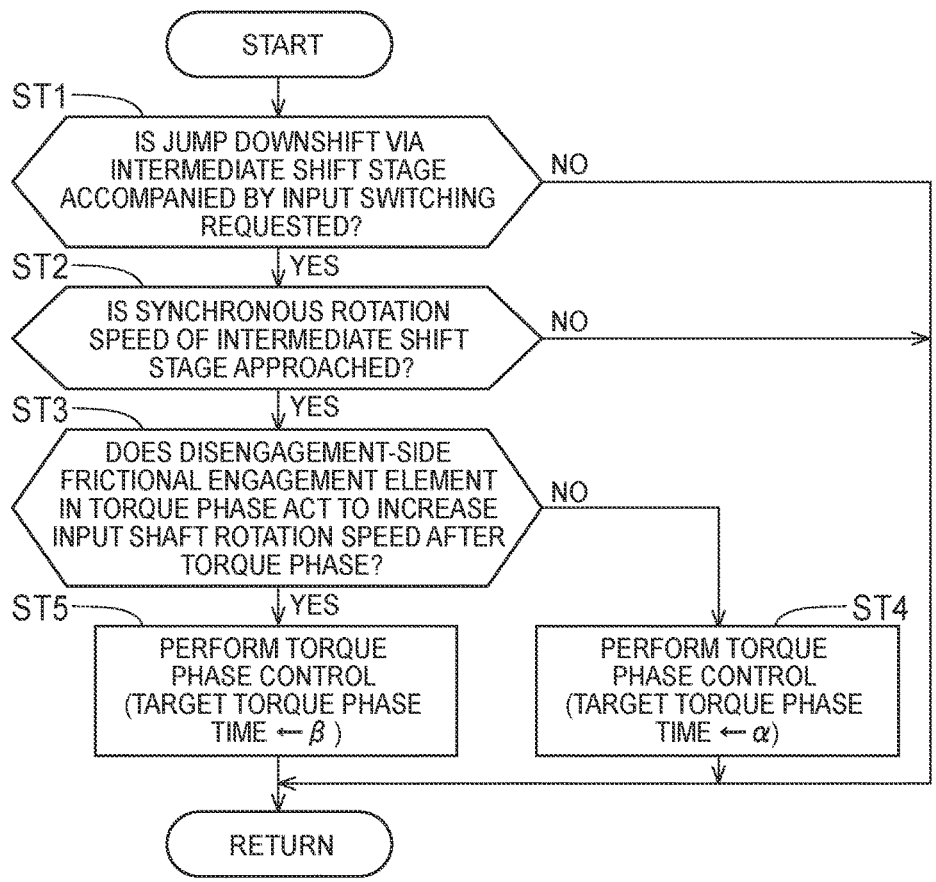

FIG. 9

|     | C1 | C2 | C3 | C4 | B1 | B2 |
|-----|----|----|----|----|----|----|
| 1st | ○  | ○  |    |    |    | ○  |
| 2nd | ○  |    |    |    | ○  | ○  |
| 3rd |    | ○  |    |    | ○  | ○  |
| 4th |    |    |    | ○  | ○  | ○  |
| 5th |    | ○  |    | ○  | ○  |    |
| 6th | ○  |    |    | ○  | ○  |    |
| 7th | ○  |    | ○  | ○  |    |    |
| 8th |    |    | ○  | ○  | ○  |    |
| 9th | ○  |    | ○  |    | ○  |    |
| 10th|    | ○  | ○  |    | ○  |    |
| Rev |    | ○  | ○  |    |    | ○  |

FIG. 10

| GEAR SHIFT PATTERN | FIRST GEAR SHIFT DISENGAGEMENT ELEMENT | FIRST GEAR SHIFT ENGAGEMENT ELEMENT | COMMON CLUTCH BEFORE AND AFTER PASSING THROUGH INTERMEDIATE SHIFT STAGE | SHIFT STAGE REALIZED IN COMBINATION OF THREE ELEMENTS | Nin INCREASE DETERMINATION |
|---|---|---|---|---|---|
| 5→3→2 | C4 | B2 | B1 | 4th | — |
| 9→7→6 | B1 | C4 | C1 | 6th | ○ |

CONTROL DEVICE FOR VEHICLE AND CONTROL METHOD FOR VEHICLE

INCORPORATION BY REFERENCE

The disclosure of Japanese Patent Application No. 2016-143527 filed on Jul. 21, 2016 including the specification, drawings and abstract is incorporated herein by reference in its entirety.

BACKGROUND

1. Technical Field

The disclosure relates to a controller for a vehicle and a control method for a vehicle. Particularly, the disclosure relates to gear shift control when a gear shift via an intermediate shift stage is performed in a stepped type automatic transmission.

2. Description of Related Art

With a recent increase in the number of shift stages of an automatic transmission, a gear shift of an automatic transmission has more often been performed by a jump gear shift (for example, a gear shift from a current shift stage to a shift stage lower by two or more stages than the current shift stage at the time of a power-on downshift).

When such a jump gear shift is performed, a variation in rotation speed of frictional engagement elements due to engagement and disengagement of the frictional engagement elements will increase. There is a likelihood that a quantity of heat generated due to sliding of friction materials of the frictional engagement elements (hereinafter also referred to as a clutch heat quantity) will increase. Therefore, in order to decrease the clutch heat quantity, a gear shift is performed via another shift stage (hereinafter also referred to as an intermediate shift stage) between a shift stage before the gear shift and a required shift stage which is required depending on driving conditions such as an accelerator depression amount.

Japanese Patent Application Publication No. 2015-148322 (JP 2015-148322 A) discloses a technique of performing a gear shift via an intermediate shift stage between a shift stage before the gear shift and a required shift stage.

SUMMARY

Such a jump gear shift via an intermediate shift stage may be accompanied by input switching in the middle of the gear shift. Specifically, when two input clutches (a first clutch and a second clutch) that can transmit power from a driving force source to a gear shift unit of the automatic transmission (for example, a gear shift unit constituted by a planetary gear mechanism) are used as engagement maintaining elements in an engaged state, a predetermined shift stage is set by the engaged state of the engagement maintaining element, a disengagement-side frictional engagement element, and an engagement-side frictional engagement element. When the predetermined shift stage is set, a case in which the engagement maintaining element is switched is referred to as input switching. That is, when an input clutch (an engagement maintaining element) varies between a gear shift from a shift stage before the gear shift to an intermediate shift stage and a gear shift from the intermediate shift stage to a target shift stage, it is necessary to switch the input clutch, which is referred to as input switching. Accordingly, in an automatic transmission having such a configuration, a gear shift may be performed via the intermediate shift stage by switching the input clutch between the first clutch and the second clutch (accompanied by input switching).

When a gear shift via an intermediate shift stage is performed accompanied by input switching in this way, there is a likelihood that a hydraulic response delay of a disengagement-side frictional engagement element or the like at the time of passing through the intermediate shift stage will occur and an input shaft rotation speed will change rapidly in the middle of the gear shift in a state in which a clutch torque after a torque phase remains. In this case, degradation in drivability is caused.

For example, when a jump gear shift (a jump downshift via an intermediate shift stage) to a third shift stage which is set by causing a third frictional engagement element and a fourth frictional engagement element to engage with each other is performed in a state in which a first frictional engagement element and a second frictional engagement element engage with each other to set an eighth shift stage, the gear shift may be performed via a fifth shift stage which is set by causing the first frictional engagement element and the third frictional engagement element to engage with each other as an intermediate shift stage. At this time, when a hydraulic response delay of the second frictional engagement element or the like (a disengagement delay of the second frictional engagement element) occurs during a gear shift to the fifth shift stage and a shift stage which is set by causing the second frictional engagement element and the third frictional engagement element to engage with each other is a shift stage (for example, a second shift stage) lower than the fifth shift stage, there is concern that the input shaft rotation speed of the automatic transmission will increase rapidly to a synchronous rotation speed of the lower shift stage. That is, an effect of suppressing an increase in input shaft rotation speed by generating a reaction force toward the fifth shift stage using the first frictional engagement element is reduced.

Similarly, when a jump upshift via an intermediate shift stage is performed and a disengagement delay of a disengagement-side frictional engagement element occurs during a gear shift to the intermediate shift stage, there is concern that the input shaft rotation speed of the automatic transmission will decrease rapidly.

In order to solve the above-mentioned problem, it is necessary to control frictional engagement elements with high accuracy at the time of passing through the intermediate shift stage accompanied by input switching.

A technique of preventing a rapid change of an input shaft rotation speed by controlling frictional engagement elements with high accuracy in a gear shift via an intermediate shift stage accompanied by input switching has not been proposed yet. For example, Japanese Patent Application Publication No. 2012-251581 (JP 2012-251581 A) discloses a technique of improving comfort at the time of a gear shift by controlling frictional engagement elements using a target torque phase time which is calculated based on an accelerator depression amount and a vehicle speed. However, in JP 2012-251581 A, a gear shift via an intermediate shift stage, particularly, a gear shift via an intermediate shift stage accompanied by input switching, being smoothly realized by adjusting the target torque phase time is not considered.

The disclosure is made to prevent a rapid change of an input shaft rotation speed in the middle of a gear shift operation when a jump gear shift via an intermediate shift stage is performed accompanied by input switching.

A first aspect of the disclosure is a control device for a vehicle. The vehicle includes an engine, driving wheels, an automatic transmission, and an electronic control unit. The automatic transmission includes a planetary gear mechanism and is disposed in a power transmission path between the engine and the driving wheels. The automatic transmission is configured to establish a shift stage of a plurality of shift stages by selectively engaging a plurality of frictional engagement elements with each other. The plurality of frictional engagement elements includes an engagement maintaining element. The engagement maintaining element is configured to transmit power from the engine to the planetary gear mechanism by engagement. The electronic control unit is configured to perform intermediate gear shift control when the electronic control unit determines that gear shift control for the automatic transmission is required for the electronic control unit and there is a shift stage difference of two or more stages between a current shift stage and a required shift stage. The required shift stage is a shift stage that is required depending on driving conditions of the vehicle. The intermediate gear shift control is control to perform a gear shift via an intermediate shift stage. The intermediate shift stage is a shift stage between the current shift stage and the required shift stage. The electronic control unit is configured to perform torque phase control replace a disengagement-side element and an engagement-side element of the plurality of frictional engagement elements at the time of a gear shift. The electronic control unit is configured to perform the torque phase control in a torque phase control time on at least one gear shift of predetermined gear shifts when the electronic control unit determines that input switching control is to be performed in the intermediate gear shift control. The predetermined gear shifts are gear shifts in which a gear shift direction from the intermediate shift stage to a predetermined shift stage is a direction in which progress of the gear shift is promoted. The first predetermined torque phase control time is shorter than a second predetermined torque phase control time. The second predetermined torque phase control time is a torque phase control time that is set for a gear shift in which a gear shift direction from the intermediate shift stage to the predetermined shift stage is a direction in which progress of the gear shift is not promoted. The torque phase control time is an execution time of the torque phase control at the time of passing through the intermediate shift stage. The predetermined shift stage is a shift stage which is set when a first frictional engagement element and a second frictional engagement element engage. The first frictional engagement element is a frictional engagement element which is disengaged at the time of a gear shift to the intermediate shift stage. The second frictional engagement element is a frictional engagement element which is the engagement maintaining element in an engaged state in a target shift stage after the intermediate shift stage. The input switching control is a control of switching the engagement maintaining element at the time of passing through the intermediate shift stage.

With the foregoing configuration, when the electronic control unit determines that the input switching control is to be performed, the electronic control unit performs the torque phase control in the torque phase control time shorter than the predetermined torque phase control time on at least one gear shift among the gear shifts in which the gear shift direction from the intermediate shift stage to the predetermined shift stage is a direction in which the progress of the gear shift is promoted. Accordingly, it is possible to complete disengagement of a disengagement-side frictional engagement element in the gear shift via the intermediate shift stage accompanied by input switching early and to suppress a rapid change of an input shaft rotation speed due to a clutch torque of the frictional engagement element remaining.

In the control device for the vehicle, when the electronic control unit determines that a power-on downshift via the intermediate shift stage accompanied by the input switching control is requested and the predetermined shift stage is a shift stage lower than the intermediate shift stage, the electronic control unit may be configured to perform the torque phase control in a third predetermined torque phase control time. The third predetermined torque phase control time may be shorter than a torque phase control time that is set when the predetermined shift stage is a shift stage higher than the intermediate shift stage, In the control device for the vehicle, when the electronic control unit determines that a power-off upshift via the intermediate shift stage accompanied by the input switching control is requested and the predetermined shift stage is a shift stage higher than the intermediate shift stage, the electronic control unit may be configured to perform a fourth predetermined torque phase control in the torque phase control time which is shorter than the torque phase control time. The fourth predetermined torque phase control time may be shorter than a torque phase control time that is set when the predetermined shift stage is a shift stage lower than the intermediate shift stage.

With the foregoing configuration, when the power-on downshift and the power-off upshift are requested, a high-speed response is required for the gear shift operation. Accordingly, the above-mentioned hydraulic response delay or the like is likely to occur and there is a likelihood that the clutch torque of the frictional engagement element which is disengaged at the time of passing through the intermediate shift stage will remain. In this situation, when a power-on downshift via an intermediate shift stage accompanied by the input switching control is requested and the predetermined shift stage is a shift stage lower than the intermediate shift stage, the electronic control unit performs the torque phase control in the shorter torque phase control time. When a power-off upshift via an intermediate shift stage accompanied by the input switching control is requested and the predetermined shift stage is a shift stage higher than the intermediate shift stage, the electronic control unit performs the torque phase control in the shorter torque phase control time. Accordingly, it is possible to complete disengagement of a frictional engagement element which is disengaged at the time of passing through the intermediate shift stage early and to prevent a clutch torque of the frictional engagement element from remaining, thereby suppressing a rapid change of the input shaft rotation speed (a rapid increase of the input shaft rotation speed when a power-on downshift is requested and a rapid decrease of the input shaft rotation speed when a power-off upshift is requested).

In the control device for the vehicle, the electronic control unit may be configured to perform the torque phase control after the electronic control unit sets a target torque phase time. The electronic control unit may be configured to perform the torque phase control after the electronic control unit sets a first target torque phase time on at least one gear shift of the predetermined gear shifts. The first target torque phase time may be shorter than a second target torque phase time. The second target torque phase time may be a target torque phase time that is set for a gear shift in which a gear shift direction from the intermediate shift stage to the predetermined shift stage is a direction in which progress of the gear shift is not promoted.

A second aspect of the disclosure is a control method for a vehicle. The vehicle includes an engine, driving wheels, an automatic transmission, and an electronic control unit. The automatic transmission includes a planetary gear mechanism and is disposed in a power transmission path between the engine and the driving wheels. The automatic transmission is configured to establish a shift stage of a plurality of shift stages by selectively engaging a plurality of frictional engagement elements with each other. The plurality of frictional engagement elements includes an engagement maintaining element. The engagement maintaining element is configured to transmit power from the engine to the planetary gear mechanism by engagement. The control method includes: performing, by the electronic control unit, intermediate gear shift control when the electronic control unit determines that gear shift control for the automatic transmission is required and there is a shift stage difference of two or more stages between a current shift stage and a required shift stage; performing, by the electronic control unit, torque phase control to replace a disengagement-side element and an engagement-side element of the plurality of frictional engagement elements at the time of a gear shift; and performing, by the electronic control unit, the torque phase control in a first predetermined torque phase control time on at least one gear shift of predetermined gear shifts when the electronic control unit determines that input switching control is to be performed in the intermediate gear shift control. The required shift stage is a shift stage that is required depending on driving conditions of the vehicle. The intermediate gear shift control is control to perform a gear shift via an intermediate shift stage. The intermediate shift stage is a shift stage between the current shift stage and the required shift stage. The predetermined gear shifts are gear shifts in which a gear shift direction from the intermediate shift stage to a predetermined shift stage is a direction in which progress of the gear shift is promoted. The first predetermined torque phase control time is shorter than a second predetermined torque phase control time. The second predetermined torque phase control time is a torque phase control time that is set for a gear shift in which a gear shift direction from the intermediate shift stage to the predetermined shift stage is a direction in which progress of the gear shift is not promoted. The torque phase control time is an execution time of the torque phase control at the time of passing through the intermediate shift stage, The predetermined shift stage is a shift stage which is set when a first frictional engagement element and a second frictional engagement element engage. The first frictional engagement element is a frictional engagement element which is disengaged at the time of a gear shift to the intermediate shift stage. The second frictional engagement element is a frictional engagement element which is the engagement maintaining element in an engaged state in a target shift stage after the intermediate shift stage. The input switching control is a control of switching the engagement maintaining element at the time of passing through the intermediate shift stage.

With the foregoing configuration, when performing a gear shift in which the gear shift direction from the intermediate shift stage to the predetermined shift stage is a direction in which the progress of the gear shift is promoted in the course of performing the gear shift via the intermediate shift stage accompanied by input switching, the electronic control unit performs the torque phase control at the time of passing through the intermediate shift stage in the shorter torque phase control time (the torque phase control time shorter than the torque phase control time which is set for a gear shift in which the gear shift direction is a direction in which the progress of the gear shift is not promoted). Accordingly, it is possible to complete disengagement of a disengagement-side element in the gear shift via the intermediate shift stage accompanied by input switching early and to suppress a rapid change of the input shaft rotation speed due to the clutch torque of the frictional engagement element remaining.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an engagement table illustrating engagement states of first to fourth clutches, a first brake, and a second brake for each shift stage in the automatic transmission;

FIG. 5 is a flowchart illustrating a torque phase control routine according to the embodiment;

FIG. 6 is a diagram illustrating an example of a change in a shift stage when a jump downshift via an intermediate shift stage is performed;

FIG. 9 is an engagement table illustrating engagement states of first to fourth clutches, a first brake, and a second brake for each shift stage in an automatic transmission according to a modified example; and FIG. 10 is a diagram illustrating an example of a change in a shift stage when a jump downshift via an intermediate shift stage is performed in an automatic transmission according to a modified example.

DETAILED DESCRIPTION OF EMBODIMENTS

Hereinafter, an embodiment of the disclosure will be described with reference to the accompanying drawings.

First, a vehicle 100 according to the embodiment will be described below with reference to FIGS. 1 to 4.

Figure 1:
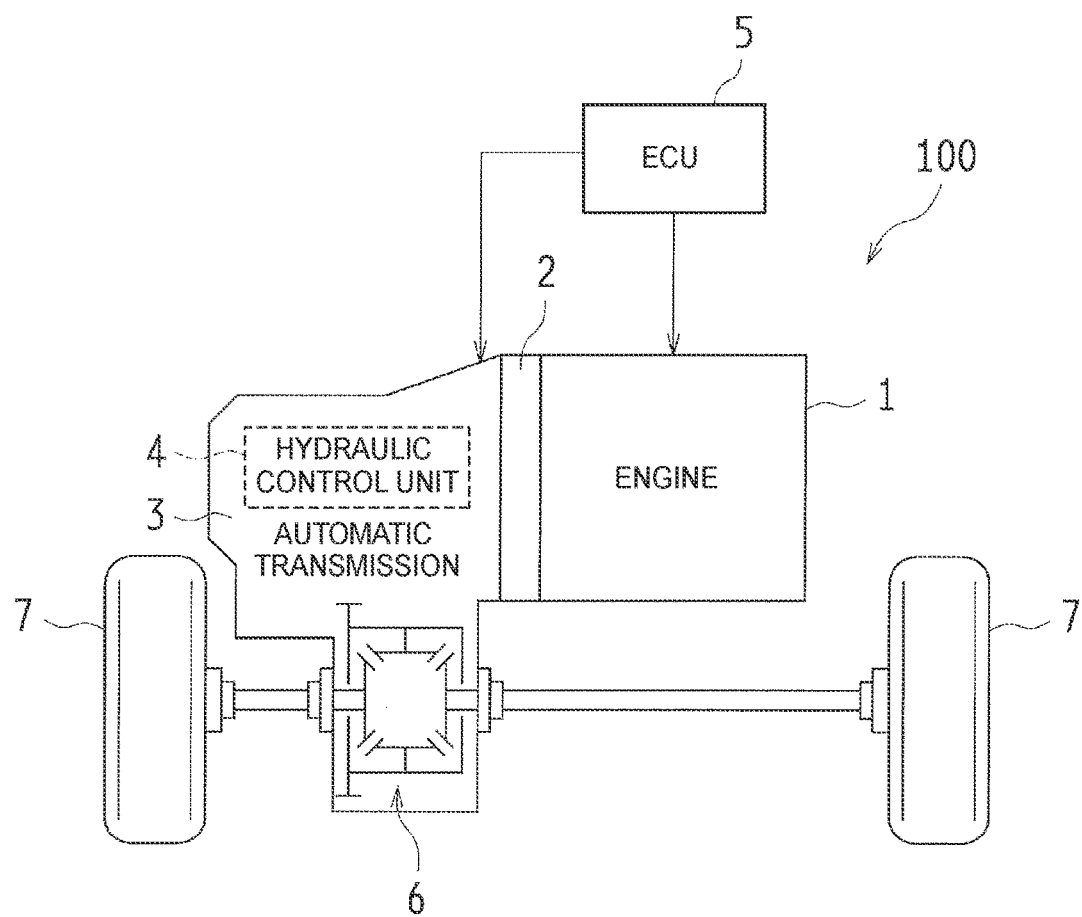
FIG. 1 is a diagram schematically illustrating a configuration of a drive system of a vehicle according to an embodiment.

As illustrated in FIG. 1, the vehicle 100 includes an engine 1, a torque converter 2, a stepped type automatic transmission 3, a hydraulic control unit 4, and an electronic control unit (ECU) 5. The vehicle 100 is, for example, of a front engine-front drive (FF) type and is configured such that an output of the engine 1 is transmitted to a differential device 6 via the torque converter 2 and the automatic transmission 3 and is assigned to right and left driving wheels (front wheels) 7.

The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

Figure 2:
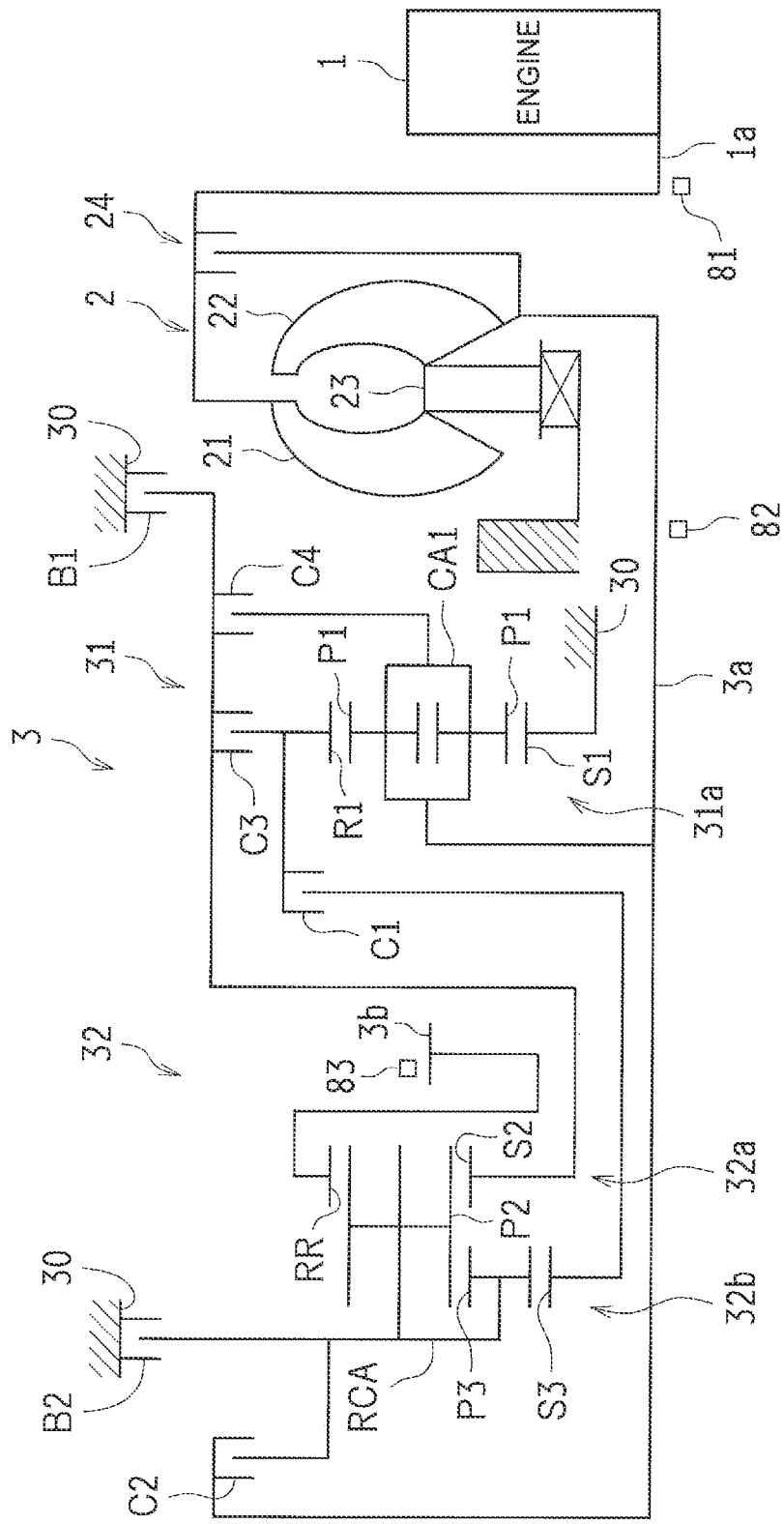
FIG. 2 is a skeleton diagram illustrating a configuration of a torque converter and an automatic transmission.

As illustrated in FIG. 2, the torque converter 2 includes a pump impeller 21 that is connected to a crank shaft 1a which is an output shaft of the engine 1, a turbine runner 22 that is connected to the automatic transmission 3, a stator 23 that has a torque amplifying function, and a lock-up clutch 24 that directly connects the engine 1 and the automatic transmission 3 to each other. In FIG. 2, a lower half below a rotation axis of the torque converter 2 and the automatic transmission 3 is omitted and only an upper half is schematically illustrated.

The automatic transmission 3 is disposed in a power transmission path between the engine 1 and the driving wheels 7 and is configured to change a rotation speed of an input shaft 3a and to output the changed rotation speed to an output shaft 3b. In the automatic transmission 3, the input shaft 3a is connected to the turbine runner 22 of the torque converter 2, and the output shaft 3b is connected to the driving wheels 7 via the differential device 6 or the like.

The automatic transmission 3 includes a first gear shift unit (a front planetary) 31 that includes a first planetary gear mechanism 31a as a main element, a second gear shift unit (a rear planetary) 32 that includes a second planetary gear mechanism 32a and a third planetary gear mechanism 32b as a main element, first to fourth clutches C1 to C4, a first brake B1, and a second brake B2.

The first planetary gear mechanism 31a constituting the first gear shift unit 31 is a double pinion type planetary gear mechanism and includes a sun gear S1, a plurality of pairs of pinion gears P1 that engage with each other, a planetary carrier CA1 that supports the pinion gears P1 such that they can rotate and revolve, and a ring gear R1 that engages with the sun gear S1 via the pinion gears P1.

The planetary carrier CA1 is connected to the input shaft 3a and integrally rotates along with the input shaft 3a. The sun gear S1 is fixed to a transmission case 30 and is not rotatable. The ring gear R1 serves as an intermediate output member and reduces the rotation speed of the input shaft 3a and transmits the reduced rotation speed to the second gear shift unit 32.

The second planetary gear mechanism 32a constituting the second gear shift unit 32 is a single pinion type planetary gear mechanism and includes a sun gear S2, a pinion gear P2, a planetary carrier RCA that supports the pinion gear P2 such that it can rotate and revolve, and a ring gear RR that engages with the sun gear S2 via the pinion gear P2.

The third planetary gear mechanism 32b constituting the second gear shift unit 32 is a double pinion type planetary gear mechanism and includes a sun gear S3, a plurality of pairs of pinion gears P2 and P3 that engage with each other, a planetary carrier RCA that supports the pinion gears P2 and P3 such that they can rotate and revolve, and a ring gear RR that engages with the sun gear S3 via the pinion gears P2 and P3. The planetary carrier RCA and the ring gear RR are shared by the second planetary gear mechanism 32a and the third planetary gear mechanism 32b.

The sun gear S2 is selectively connected to the transmission case 30 by the first brake B1. The sun gear S2 is selectively connected to the ring gear R1 via the third clutch C3. The sun gear S2 is further selectively connected to the planetary carrier CA1 via the fourth clutch C4. The sun gear S3 is selectively connected to the ring gear R1 via the first clutch C1. The planetary carrier RCA is selectively connected to the transmission case 30 by the second brake B2. The planetary carrier RCA is selectively connected to the input shaft 3a via the second clutch C2. The ring gear RR is connected to the output shaft 3b and integrally rotates along with the output shaft 3b.

The first to fourth clutches C1 to C4, the first brake B1, and the second brake B2 are frictional engagement elements that are frictionally engaged by hydraulic actuators and are controlled by the hydraulic control unit 4 and the ECU 5.

FIG. 3 is an engagement table illustrating engaged states or disengaged states of the first to fourth clutches C1 to C4, the first brake B1, and the second brake B2 for each shift stage (each gear stage). In the engagement table illustrated in FIG. 3, mark O denotes an "engaged state" and a blank denotes a "disengaged state."

As illustrated in FIG. 3, in the automatic transmission 3 according to this embodiment, the first clutch C1 and the second brake B2 engage with each other to set a first shift stage (1st) having a largest gear ratio (the rotation speed of the input shaft 3a/the rotation speed of the output shaft 3b). The first clutch C1 and the first brake B1 engage with each other to set a second shift stage (2nd).

The first clutch C1 and the third clutch C3 engage with each other to set a third shift stage (3rd). The first clutch C1 and the fourth clutch C4 engage with each other to set a fourth shift stage (4th). The first clutch C1 and the second clutch C2 engage with each other to set a fifth shift stage (5th). The second clutch C2 and the fourth clutch C4 engage with each other to set a sixth shift stage (6th). The second clutch C2 and the third clutch C3 engage with each other to set a seventh shift stage (7th). The second clutch C2 and the first brake B1 engage with each other to set an eighth shift stage (8th). The third clutch C3 and the second brake B2 engage with each other to set a reverse shift stage (Rev).

In this way, the automatic transmission 3 is configured to set one of a plurality of shift stages by selectively causing the plurality of frictional engagement elements to engage with each other.

The hydraulic control unit 4 is provided to control states (an engaged state or a disengaged state) of the frictional engagement elements of the automatic transmission 3. The hydraulic control unit 4 also has a function of controlling the lock-up clutch 24 of the torque converter 2.

Figure 4:
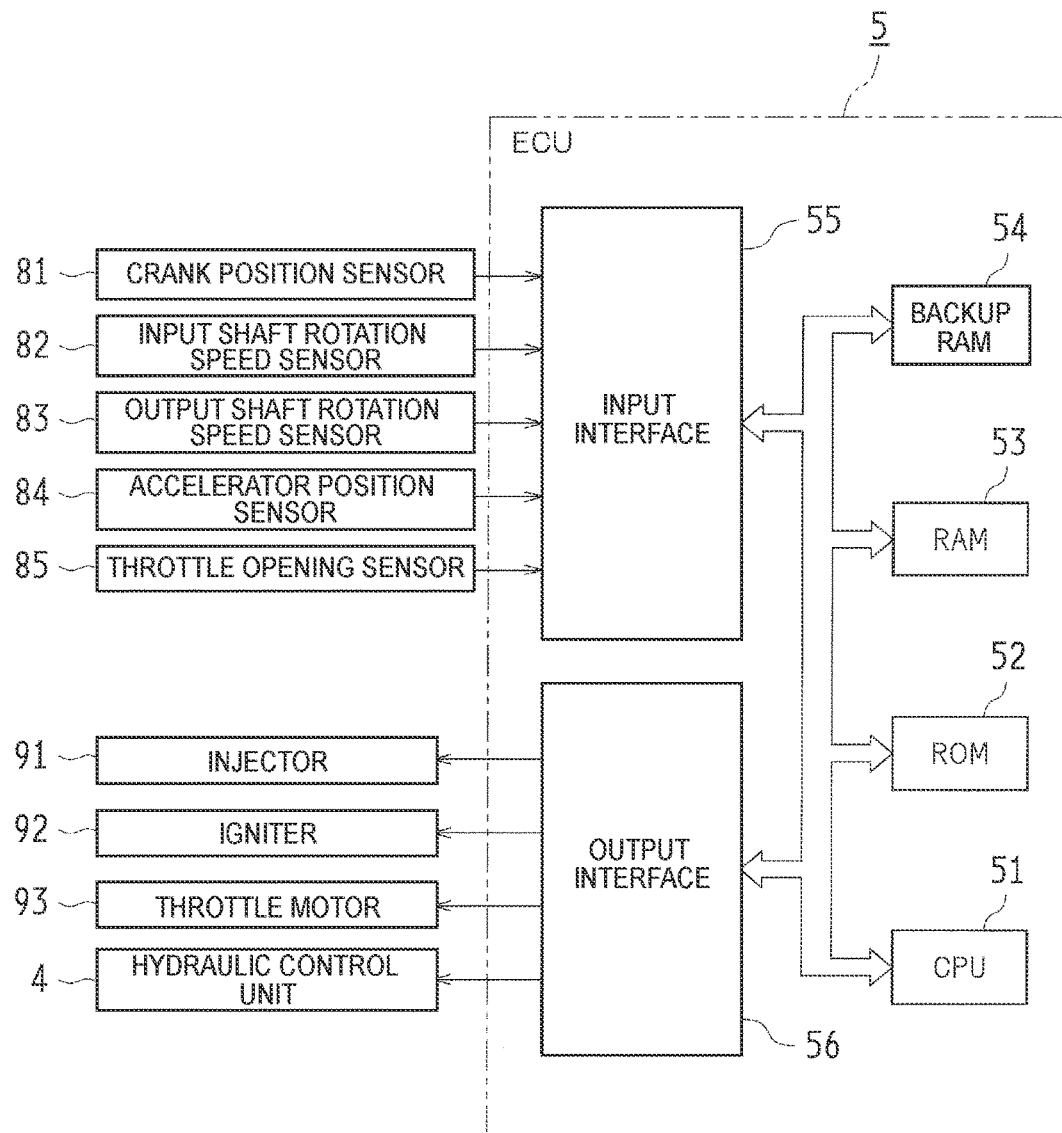
FIG. 4 is a block diagram illustrating a configuration of a control system of the vehicle.

The ECU 5 is configured to perform operation control of the engine 1, gear shift control of the automatic transmission 3, and the like. Specifically, as illustrated in FIG. 4, the ECU 5 includes a CPU 51, a ROM 52, a RAM 53, a backup RAM 54, an input interface 55, and an output interface 56. The ECU 5 is an example of the "electronic control unit" in the disclosure.

The CPU 51 performs an arithmetic process based on various control programs or maps stored in the ROM 52. In the ROM 52, various control programs, maps which are referred to when the control programs are executed, and the like are stored. The RAM 53 is a memory that temporarily stores process results of the CPU 51, detection results of various sensors, and the like. The backup RAM 54 is a nonvolatile memory that stores data to be stored when the ignition is turned off.

The input interface 55 is connected to a crank position sensor 81, an input shaft rotation speed sensor 82, an output shaft rotation speed sensor 83, an accelerator position sensor 84, a throttle opening sensor 85, and the like.

The crank position sensor 81 is provided to calculate a rotation speed of the engine 1. The input shaft rotation speed sensor 82 is provided to calculate a rotation speed of the input shaft 3a (an input shaft rotation speed; a turbine rotation speed) of the automatic transmission 3. The output shaft rotation speed sensor 83 is provided to calculate a rotation speed of the output shaft 3b (an output shaft rotation speed) of the automatic transmission 3. A vehicle speed can be calculated from the output shaft rotation speed. The accelerator position sensor 84 is provided to detect an accelerator depression amount which is a depression amount (an operation amount) of an accelerator pedal. The throttle opening sensor 85 is provided to detect a throttle opening level of a throttle valve.

The output interface 56 is connected to an injector 91, an igniter 92, a throttle motor 93, the hydraulic control unit 4, and the like. The injector 91 is a fuel injection valve and an amount of fuel injected therefrom can be adjusted. The igniter 92 is provided to adjust an ignition timing using an ignition plug. The throttle motor 93 is provided to adjust the throttle opening level of the throttle valve.

The ECU 5 is configured to control the operation state of the engine 1 by controlling the throttle opening level, the amount of fuel injected, the ignition timing, and the like based on the detection results of various sensors and the like. The ECU 5 is configured to perform gear shift control of the automatic transmission 3 and control of the lock-up clutch 24 of the torque converter 2 by controlling the hydraulic control unit 4.

In the gear shift control by the ECU 5, a required shift stage is set, for example, based on a gear shift map with the vehicle speed and the accelerator depression amount as parameters, and the hydraulic control unit 4 is controlled such that an actual shift stage is the required shift stage.

Before describing control (torque phase control in a jump gear shift) by which this embodiment is characterized, gear shift control for determining a control operation amount by which a gear shift target value is realized in the automatic transmission 3 will be schematically described below.

As general gear shift control, for example, a technique of determining a torque capacity (or a hydraulic pressure command value) of each frictional engagement element at a gear shift time and performing a gear shift based on a predetermined control map which has been determined in advance by adaptation while evaluating whether a gear shift shock, a shifting time, or the like is appropriate in an actual vehicle is known. In the technique using the control map, it is necessary to prepare a plurality of control maps depending on a gear shift pattern of a power-on downshift, a power-off upshift, or the like and a combination of shift stages before and after the gear shift. Accordingly, greater labor is required for adaptation work as the number of shift stages of the automatic transmission becomes larger.

Therefore, in this embodiment, a technique of performing a gear shift using a gear shift model for determining a control operation amount by which the gear shift target value is realized is employed as the gear shift control instead of the technique using the control map. The gear shift target value is a target value of a factor (such as a shifting time or a driving force) for determining a change mode to be realized at the time of a gear shift. The control operation amount is a value required during operation for a factor (such as an engine torque or a clutch torque) to reach a control target.

The gear shift control using a gear shift model will be described below. Equations of motion during the gear shift are expressed by Equations (1) and (2).

$$d\omega t/dt = a1 \cdot Tt + b1 \cdot Tcapl + c1 \cdot Tcdrn + d1 \cdot d\omega o/dt \quad (1)$$

$$To = a2 \cdot Tt + b2 \cdot Tcapl + c2 \cdot Tcdrn + d2 \cdot d\omega o/dt \quad (2)$$

Equations (1) and (2) are derived from equations of motion of connected rotary elements constituting the automatic transmission 3 and relational expressions of the planetary gear mechanisms constituting the automatic transmission 3. The equation of motion of each rotary element is an equation of motion in which the first predetermined torque is defined as the second predetermined torque. The first predetermined torque is a torque which is expressed by a product of a moment of inertia and a change rate of a rotation speed in each rotary element. The second predetermined torque is a torque acting on a member associated with the rotary element among three members of the planetary gear mechanism and both members of each frictional engagement element. The relational expressions in each planetary gear mechanism are relational expressions in which a torque relationship between three members and a relationship in rotation speed change rate in the planetary gear mechanism are defined using a gear ratio of the planetary gear mechanism.

In Equations (1) and (2), $d\omega t/dt$ is a derivative with respect to time, that is, a change rate, of a turbine rotation speed (a rotational angular velocity) $\omega t$ (that is, an input shaft rotation speed $\omega i$) and denotes an acceleration of the input shaft 3a (an angular acceleration which is hereinafter referred to as an input shaft acceleration) as a change in speed of a rotary member on the input shaft 3a side. $d\omega o/dt$ is a change rate of an output shaft rotation speed $\omega o$ and denotes an output shaft acceleration. Tt denotes a turbine torque which is a torque on the input shaft 3a as a torque on a rotary member on the input shaft 3a side, that is, a transmission input torque Ti. The turbine torque Tt has the same meaning as an engine torque Te (=Tt/t) in consideration of a torque ratio t of the torque converter 2. To denotes a transmission output torque which is a torque on the output shaft 3b as a torque on a rotary member on the output shaft 3b side. Tcapl denotes a torque capacity of a frictional engagement element that performs an engagement operation at the gear shift time (hereinafter referred to as an engagement-side clutch torque). Tcdrn denotes a torque capacity of a frictional engagement element that performs a disengagement operation at the gear shift time (hereinafter referred to as a disengagement-side clutch torque). Here, a1, a2, b1, b2, c1, c2, d1, and d2 are constants when Equations (1) and (2) are derived and are coefficients which are determined in design from the moment of inertia of each rotary element and the gear ratio of the planetary gear mechanism. Specific numerical values of the constants vary, for example, depending on a gear shift type (for example, a gear shift pattern or a combination of shift stages before and after the gear shift). Accordingly, an equation of motion is individual, but equations of motion corresponding to gear shift types in which the constants differ depending on the gear shift type are used for the gear shift of the automatic transmission 3.

Equations (1) and (2) are gear train equations of motion of the automatic transmission 3 which are obtained by formularizing a relationship between the gear shift target values and the control operation amounts. The gear shift target values can express target values for the shifting time and the driving force and are handled in the gear train equations of motion. In this embodiment, the input shaft acceleration $d\omega t/dt$ is used as an example of a physical quantity that can express the shifting time. The transmission output torque To is used as an example of a physical quantity that can express the driving force. In this embodiment, the gear shift target values are set to two values of the input shaft acceleration $d\omega t/dt$ and the transmission output torque To, respectively.

On the other hand, in this embodiment, the control operation amounts for establishing the gear shift target values are set by three values including the turbine torque Tt (which has the same meaning as the engine torque Te), the engagement-side clutch torque Tcapl, and the disengagement-side clutch torque Tcdrn. Then, since the equations of motion include two equations of Equations (1) and (2) and there are three control operation amounts, the control operation amounts for establishing two gear shift target values do not have unique solutions. The output shaft acceleration $d\omega o/dt$ in the equations is calculated from the output shaft rotation speed $\omega o$ which is a value detected by the transmission output shaft rotation speed sensor 83.

Therefore, research has been conducted on obtaining unique solutions for the control operation amounts by adding limiting conditions to the equations of motion of Equations (1) and (2). In this embodiment, torque assignment proportions of transmission torques assigned to the disengagement-side clutch and the engagement-side clutch are used as the limiting conditions which can cope with any gear shift pattern. The limiting condition is suitable for expressing or controlling delivery of a torque during the gear shift. That is, the torque assignment proportions of a transmission torque are set as the limiting conditions. The torque assignment proportions enable the delivery of a torque during the gear shift to be incorporated into the equations of motion and enable the control operation amounts to have unique solutions. The torque assignment proportions are proportions of the transmission torques at which a total transmission torque on the input shaft is assigned to both frictional engagement elements when the total transmission torque (a total transmission torque) is replaced with, for example, the torque on the input shaft 3a (the total transmission torque on the input shaft). The total transmission torque is a torque which needs to be assigned to the disengagement-side clutch and the engagement-side clutch during the gear shift of the automatic transmission 3. In this embodiment, the torque assignment proportion of the engagement-side clutch is defined as "xapl" and the torque assignment proportion of the disengagement-side clutch is defined as "xdrn." Equations (3) and (4) are defined as follows using a torque assignment proportion x (for example, $0 \leq x \leq 1$) varying in a time series to reflect the delivery of a torque during the gear shift.

$$xapl = x \quad (3)$$

$$xdrn = 1-x \quad (4)$$

The relational expression between the engagement-side clutch torque Tcapl and the disengagement-side clutch torque Tcdrn can be defined using "x" (=xapl) and "1−x" (=xdrn) based on "Tcapl" and "Tcdrn" replaced with the torque on the input shaft 3a and Equations (3) and (4). The relational expressions for calculating the turbine torque Tt, the engagement-side clutch torque Tcapl, and the disengagement-side clutch torque Tcdrn which are the control operation amounts are derived from Equations (1) and (2) and the relational expression between "Tcapl" and "Tcdrn." The turbine torque Tt (which has the same meaning as the engine torque Te) is expressed by a relational expression using "x" (=xapl), "1−x" (=xdrn), the input shaft acceleration $d\omega t/dt$, the transmission output torque To, and the like. Similarly, the engagement-side clutch torque Tcapl is expressed by a relational expression using "x" (=xapl), the input shaft acceleration $d\omega t/dt$, the transmission output torque To, and the like. Similarly, the disengagement-side clutch torque Tcdrn is expressed by a relational expression using "1−x" (=xdrn), the input shaft acceleration $d\omega t/dt$, the transmission output torque To, and the like.

That is, a gear shift model in this embodiment is for calculating the control operation amounts based on the gear shift target values using the equations of motion (Equations (1) and (2)) of the automatic transmission 3 including the gear shift target values and the control operation amounts and the relational expressions (Equations (3) and (4)) indicating the torque assignment proportions. In this way, in this embodiment, the gear shift of the automatic transmission 3 is performed using the gear shift model by adding the limiting conditions set with the torque assignment proportion x to Equations (1) and (2). Accordingly, even when three control operation amounts are present for two gear shift target values, three control operation amounts can be appropriately determined using the gear shift model. Since the gear shift model is individual but gear train equations of motion in which the constants differ depending on the gear shift type (for example, the gear shift pattern or the combination of shift stages before and after the gear shift) are used as described above, the gear shift models corresponding to the gear shift types are used for the gear shift of the automatic transmission 3.

Torque phase control (control of performing replacement of a disengagement-side element and an engagement-side element) which is a feature of this embodiment will be described below. In this embodiment, a case in which jump downshift control via an intermediate shift stage (particularly, power-on jump downshift control via an intermediate shift stage) is performed as the torque phase control will be described as an example.

The jump downshift control is control for performing a gear shift from a current shift stage to a shift stage lower by two or more stages than the current shift stage, for example, at the time of a power-on jump downshift. Examples thereof include a case in which an accelerator pedal depression amount increases during traveling at the sixth shift stage and a gear shift is performed with a required shift stage set to the third shift stage and a case in which the accelerator pedal depression amount increases during traveling at the eighth shift stage and a gear shift is performed with a required shift stage set to the third shift stage.

In the automatic transmission 3 having a large number of shift stages as in this embodiment, a variation in gear shift ratio before and after a gear shift which can be realized by replacement of a pair of frictional engagement elements (a so-called clutch-to-clutch gear shift) is likely to increase. In this case, a variation in rotation speed of the frictional engagement elements due to disengagement and engagement of the frictional engagement elements increases and a quantity of heat generated due to sliding of friction materials between the frictional engagement elements (a clutch heat quantity) increases.

An example of means for guaranteeing durability (particularly, durability of friction materials) by suppressing an increase in temperature of the frictional engagement elements is to decrease a transmission torque during a gear shift (for example, torque-down control of the engine 1). However, in this case, the driving force during the gear shift may decrease or a variation in the driving force after the gear shift may increase, thereby causing degradation in drivability. Another example of the means for guaranteeing the durability is to increase a heat capacity of the frictional engagement elements. However, in this case, an increase in size of the frictional engagement elements is caused. As a result, an increase in size and weight of the automatic transmission 3, an increase in manufacturing cost, degradation in power transmission efficiency, and the like are caused.

In order to solve this problem, when a jump downshift request occurs, a gear shift is performed via another shift stage (an intermediate shift stage) between a shift stage before the gear shift and a required shift stage set based on the gear shift map.

The jump downshift via an intermediate shift stage may be accompanied by input switching in the middle of the gear shift. Specifically, in the automatic transmission 3 according to this embodiment, the first clutch C1 and the second clutch C2 have a function of an input clutch that transmits power from the engine 1 to the second gear shift unit 32 of the automatic transmission 3 in an engaged state. The input clutch includes a plurality of frictional engagement elements serving as an engagement maintaining element that can transmit power from a driving force source to a gear shift unit. That is, when the first clutch and the second clutch are used as the engagement maintaining elements, a predetermined shift stage is set by the engaged state of the engagement maintaining elements, a disengagement-side element, and an engagement-side element. The case in which the engagement maintaining element is switched is referred to as input switching. Accordingly, when the input clutch (the engagement maintaining element) differs in a gear shift from a shift stage before the gear shift to an intermediate shift stage and a gear shift from the intermediate shift stage to a target shift stage thereafter, it is necessary to switch the input clutch, which is referred to as input switching. Accordingly, in the automatic transmission 3 having this configuration, the gear shift may be performed via the intermediate shift stage by switching the input clutch between the first clutch and the second clutch (accompanied by input switching).

For example, when a jump downshift from the sixth shift stage to the third shift stage is performed via the fourth shift stage as an intermediate shift stage, the input clutch is switched from the second clutch C2 to the first clutch C1 at the time of passing through the fourth shift stage. When a jump downshift from the eighth shift stage to the third shift stage is performed via the fifth shift stage as an intermediate shift stage, the input clutch is also switched from the second clutch C2 to the first clutch C1 at the time of passing through the fifth shift stage.

When a gear shift is performed via an intermediate shift stage accompanied by input switching in this way, there is a likelihood that a hydraulic response delay of a disengagement-side element or the like at the time of passing through the intermediate shift stage will occur and the input shaft rotation speed will change rapidly (increase rapidly) in the middle of the gear shift in a state in which a clutch torque after a torque phase remains. In this case, degradation in drivability is caused.

For example, when a jump gear shift to the third shift stage which is set by causing the first clutch C1 and the third clutch C3 to engage with each other is performed in a state in which the second clutch C2 and the first brake B1 engage with each other to set the eighth shift stage, the gear shift may be performed via the fifth shift stage which is set by causing the first clutch C1 and the second clutch C2 to engage with each other as an intermediate shift stage. At this time, when a hydraulic response delay of the first brake B1 or the like occurs during the gear shift to the fifth shift stage, a shift stage which is set by causing the first brake B1 and the first clutch C1 to engage with each other is the second shift stage lower than the fifth shift stage. Accordingly, there is concern that the input shaft rotation speed will increase rapidly to the synchronous rotation speed of the second shift stage.

A technique of performing control of frictional engagement elements with high accuracy at the time of passing through an intermediate shift stage accompanied by input switching and suppressing a rapid increase of the input shaft rotation speed has not been proposed yet.

This embodiment is made in consideration of these circumstances and is to suppress a rapid increase of the input shaft rotation speed in the middle of the gear shift operation when a jump gear shift via an intermediate shift stage is performed accompanied by input switching.

Specifically, in this embodiment, when it is determined that input switching control is to be performed in the course of performing a gear shift via an intermediate shift stage (for example, in the course of performing a jump downshift from the eighth shift stage to the third shift stage using the fifth shift stage as an intermediate shift stage), the ECU 5 performs torque phase control in a torque phase control time shorter than a torque phase control time, which is set for a gear shift in which the direction of the gear shift is an upshift direction in which the progress of the gear shift is promoted, on at least one gear shift among gear shifts in which the direction of a gear shift to a predetermined shift stage (the second shift stage in the above description) which is set when the first frictional engagement element (the first brake B1 in the above description) and the second frictional engagement element (the first clutch C1 in the above description) engage with each other is a downshift direction. The input switching control is control in which a frictional engagement element serving as an engagement maintaining element that transmits a power from the engine 1 to the second gear shift unit 32 is switched at the time of passing through the intermediate shift stage. The first frictional engagement element is a frictional engagement element which is disengaged at the time of the gear shift to the intermediate shift stage. The second frictional engagement element is a frictional engagement element which serves as the engagement maintaining element in an engaged state in the target shift stage after the intermediate shift stage.

For example, when the jump downshift accompanied by input switching is performed as described above and a predetermined shift stage which is set by causing the first frictional engagement element and the second frictional engagement element to engage with each other is a shift stage lower than the intermediate shift stage, the torque phase control is performed in a torque phase control time shorter than the torque phase control time which is set when the predetermined shift stage is a shift stage higher than the intermediate shift stage.

The torque phase control is performed by the ECU 5. Accordingly, in the ECU 5, a functional part that performs the torque phase control is configured as a torque phase control unit in the disclosure.

A routine of the torque phase control according to this embodiment will be described below with reference to the flowchart illustrated in FIG. 5. This flowchart is repeatedly performed at predetermined intervals after a start switch of the vehicle is turned on.

First, in Step ST1, it is determined whether a gear shift request of the automatic transmission 3 occurs and the gear shift request is a jump downshift request via an intermediate shift stage accompanied by input switching. That is, it is determined whether a required shift stage which is set based on the gear shift map is a shift stage lower by two or more stages than a current shift stage and the gear shift to the required shift stage needs to be performed via an intermediate shift stage and is accompanied by input switching.

Examples of the jump downshift request via an intermediate shift stage accompanied by input switching include a case in which a downshift from the sixth shift stage to the third shift stage is requested due to an increase in accelerator depression amount detected by the accelerator position sensor 84 during the vehicle traveling at the sixth shift stage and the fourth shift stage is set as the intermediate shift stage and a case in which a downshift from the eighth shift stage to the third shift stage is requested due to an increase in accelerator depression amount detected by the accelerator position sensor 84 during the vehicle traveling at the eighth shift stage and the fifth shift stage is set as the intermediate shift stage.

For each combination of shift stages before and after a gear shift in a jump downshift, information on whether the gear shift needs to be performed via an intermediate shift stage and information on a selected intermediate shift stage are stored in advance in the ROM in consideration of the clutch heat quantity as described above. When a jump downshift request occurs, the ECU 5 determines whether the jump downshift needs to be performed via an intermediate shift stage with reference to the information stored in the ROM. When it is determined that the jump downshift needs to be performed via an intermediate shift stage, the intermediate shift stage is set depending on the combination of shift stages before and after the gear shift. The information on whether the gear shift needs to be performed via an intermediate shift stage and the information on a selected intermediate shift stage which are stored in the ROM may be set depending on the combination of shift stages before and after the gear shift in the jump downshift and the vehicle speed (which corresponds to the rotation speed of the output shaft 3b calculated based on the output signal of the output shaft rotation speed sensor 83). For example, even when the combination of shift stages before and after the gear shift is the same, it is determined that the gear shift needs to be performed via an intermediate shift stage when the vehicle speed is equal to or higher than a predetermined value, and it is determined that the gear shift does not need to be performed via an intermediate shift stage when the vehicle speed is lower than the predetermined value.

It is determined whether the intermediate shift stage through which the jump downshift passes is accompanied by input switching based on the gear shift map. For example, when a jump downshift from the sixth shift stage to the third shift stage is performed via the fourth shift stage as an intermediate shift stage or a jump downshift from the eighth shift stage to the third shift stage is performed via the fifth shift stage as an intermediate shift stage, the input clutch is switched from the second clutch C2 to the first clutch C1 at the time of passing through the intermediate shift stage. Accordingly, in this case, it is determined that the intermediate shift stage through which the jump downshift passes is accompanied by input switching.

In the following cases, the determination result of Step ST1 is negative and the routine is restarted: (1) a case in which a jump downshift via an intermediate shift stage accompanied by input switching does not occur, that is, a case in which the gear shift request of the automatic transmission 3 is an upshift request; (2) a case in which the gear shift request is a downshift request is a downshift request for changing only one shift stage; (3) a case in which the gear shift request is a jump downshift request in which the clutch heat quantity can be suppressed to be low without passing through an intermediate shift stage; (4) a case in which the gear shift request is a jump downshift request not accompanied by input switching; and (5) a case in which the gear shift request of the automatic transmission 3 does not occur. In this case, when a gear shift request other than the jump downshift request via an intermediate shift stage accompanied by input switching occurs, a gear shift corresponding to the gear shift request is performed.

On the other hand, when a jump downshift request via an intermediate shift stage accompanied by input switching occurs and the determination result of Step ST1 is positive, it is determined in Step ST2 whether the input shaft rotation speed approaches the synchronous rotation speed of the intermediate shift stage. That is, a gear shift from a shift stage before the gear shift starts to the intermediate shift stage starts and it is determined whether the input shaft rotation speed approaches the synchronous rotation speed of the intermediate shift stage with the progress of the gear shift. For example, it is determined whether the input shaft rotation speed is within a predetermined deviation from the synchronous rotation speed of the intermediate shift stage. Here, since the downshift to the intermediate shift stage is performed, it is determined whether the input shaft rotation speed is lower than the synchronous rotation speed of the intermediate shift stage and the difference therebetween is within a predetermined deviation. The deviation serving as a threshold value is set by experiment or simulation.

When the input shaft rotation speed does not approach the synchronous rotation speed of the intermediate shift stage and the determination result of Step ST2 is negative, the routine restarts. That is, it is determined that the timing at which the torque phase control starts does not arrive yet and the routine restarts. That is, in a period in which the jump downshift request via an intermediate shift stage occurs, it is waited that the input shaft rotation speed approaches the synchronous rotation speed of the intermediate shift stage.

On the other hand, when the input shaft rotation speed approaches the synchronous rotation speed of the intermediate shift stage and the determination result of Step ST2 is positive, it is determined in Step ST3 whether the disengagement-side element in the torque phase acts to increase the input shaft rotation speed after the torque phase. That is, it is determined whether the input shaft rotation speed increases rapidly in a state in which a hydraulic response delay or the like occurs and a clutch torque remains in the disengagement-side element as described above.

For example, when a jump downshift from the sixth shift stage to the third shift stage is performed via the fourth shift stage as an intermediate shift stage and the jump gear shift to the third shift stage is performed in the state in which the sixth shift stage is set, the gear shift is performed via the fourth shift stage which is set by causing the first clutch C1 and the fourth clutch C4 to engage with each other as the intermediate shift stage. The sixth shift stage is set by causing the second clutch C2 and the fourth clutch C4 to engage with each other. The third shift stage is set by causing the first clutch C1 and the third clutch C3 to engage with each other. At this time, when a hydraulic response delay of the second clutch C2 or the like occurs during the gear shift to the fourth shift stage, there is a likelihood that the second clutch C2 and the first clutch C1 will engage with each other. However, the shift stage which is set in this case is the fifth shift stage (the gear shift in the direction toward the fifth shift stage is an example of the gear shift in which the gear shift direction is a direction in which the progress of the gear shift is not promoted in the disclosure) higher than the fourth shift stage. Accordingly, the input shaft rotation speed does not increase rapidly. In this case, the determination result of Step ST3 is negative.

On the other hand, for example, when a jump downshift from the eighth shift stage to the third shift stage is performed via the fifth shift stage as an intermediate shift stage and the jump gear shift to the third shift stage is performed in the state in which the eighth shift stage is set, the gear shift is performed via the fifth shift stage which is set by causing the first clutch C1 and the second clutch C2 to engage with each other as the intermediate shift stage. The eighth shift stage is set by causing the second clutch C2 and the first brake B1 to engage with each other. The third shift stage is set by causing the first clutch C1 and the third clutch C3 to engage with each other. At this time, when a hydraulic response delay of the first brake B1 or the like occurs during the gear shift to the fifth shift stage, there is a likelihood that the first brake B1 and the first clutch C1 will engage with each other. However, the shift stage which is set in this case is the second shift stage (the gear shift in the direction toward the second shift stage is an example of the gear shift in which the gear shift direction is a direction in which the progress of the gear shift is promoted in the disclosure) lower than the fifth shift stage. Accordingly, there is a likelihood that the input shaft rotation speed will increase rapidly. As a result, in this case, the determination result of Step ST3 is positive.

When the disengagement-side element in the torque phase does not act to increase the input shaft rotation speed after the torque phase, the determination result of Step ST3 is negative and the torque phase control is performed with a target torque phase time (a target value of the torque phase control time) set to $\alpha$ in Step ST4. The target torque phase time $\alpha$ is set based on a parameter (such as an accelerator depression amount or a vehicle speed) indicating a required driving force from a driver (is set to be longer than a target torque phase time $\beta$ to be described later), is set by experiment or simulation, and is stored as a map (a target torque phase time map) in the ROM. That is, in Step ST4, the target torque phase time $\alpha$ is read from the target torque phase time map and hydraulic pressures which are supplied to and discharged from the frictional engagement elements are controlled such that the target torque phase time $\alpha$ is achieved. Specifically, the disengagement-side clutch torque Tcdrn and the engagement-side clutch torque Tcapl are calculated using Equations (1) and (2) such that the target torque phase time $\alpha$ is achieved. For example, when a jump downshift from the sixth shift stage to the third shift stage is performed via the fourth shift stage as an intermediate shift stage, the clutch torque of the second clutch C2 which is a disengagement-side clutch and the clutch torque of the first clutch C1 which is an engagement-side clutch are calculated such that the target torque phase time $\alpha$ at the time of passing through the intermediate shift stage (the fourth shift stage) is achieved, and the torque phase control is performed.

After the torque phase control is performed with the target torque phase time $\alpha$ set in this way, a gear shift from the intermediate shift stage to the required shift stage is performed. When the required shift stage is set, the current gear shift (the jump downshift via the intermediate shift stage) ends.

On the other hand, when the disengagement-side element in the torque phase acts to increase the input shaft rotation speed after the torque phase, the determination result of Step ST3 is positive and the torque phase control is performed with the target torque phase time set to $\beta$ in Step ST5. The target torque phase time $\beta$ is set to be shorter than the target torque phase time $\alpha$. In this case, the target torque phase time $\beta$ may be calculated by multiplying the target torque phase time $\alpha$ read from the target torque phase time map by a predetermined correction coefficient (a correction coefficient less than 1). Alternatively, a map for calculating the target torque phase time $\beta$ (a map for determining the target torque phase time $\beta$ depending on a combination of a shift stage before starting the gear shift and the intermediate shift stage or the like) set by experiment or simulation may be stored in the ROM and the target torque phase time $\beta$ may be read from the map. In Step ST5, hydraulic pressures which are supplied to and discharged from the frictional engagement elements are controlled such that the target torque phase time $\beta$ is achieved. Specifically, the disengagement-side clutch torque Tcdrn and the engagement-side clutch torque Tcapl are calculated using Equations (1) and (2) such that the target torque phase time $\beta$ is achieved. For example, when a jump downshift from the eighth shift stage to the third shift stage is performed via the fifth shift stage as an intermediate shift stage, the clutch torque of the first brake B1 which is a disengagement-side clutch and the clutch torque of the first clutch C1 which is an engagement-side clutch are calculated such that the target torque phase time $\beta$ at the time of passing through the intermediate shift stage (the fifth shift stage) is achieved, and the torque phase control is performed.

After the torque phase control is performed with the target torque phase time $\beta$ set in this way, a gear shift from the intermediate shift stage to the required shift stage is performed. When the required shift stage is set, the current gear shift (the jump downshift via the intermediate shift stage) ends.

When the short target torque phase time is set in this way, it is possible to complete disengagement of the disengagement-side element at the time of passing through the intermediate shift stage accompanied by input switching early and to suppress a rapid increase of the input shaft rotation speed due to the clutch torque of the frictional engagement element remaining.

The operations of Steps ST4 and ST5 are an example of "to perform the torque phase control in the torque phase control time which is shorter than a predetermined torque phase control time on at least one gear shift among the gear shifts in which the gear shift direction from the intermediate shift stage to the predetermined shift stage is a direction in which the progress of the gear shift is promoted" in the disclosure. The predetermined shift stage is a shift stage which is set by causing the first frictional engagement element and the second frictional engagement element to engage with each other. The first frictional engagement element is a frictional engagement element which is disengaged at the time of the gear shift to the intermediate shift stage. The second frictional engagement element is a frictional engagement element which serves as the engagement maintaining element in the engaged state in a target shift stage after the intermediate shift stage. The predetermined torque phase control time is a torque phase control time which is set for a gear shift in which the gear shift direction from the intermediate shift stage to the predetermined shift stage is a direction in which the progress of the gear shift is not promoted.

In this embodiment, examples of the gear shift in which the progress of the gear shift is promoted among the gear shifts in the direction to a shift stage which is set when the frictional engagement element which is disengaged at the time of the gear shift to the intermediate shift stage and the frictional engagement element serving as the engagement maintaining element in the engaged state in the target shift stage after the intermediate shift stage engage with each other, that is, the gear shifts in the downshift direction to the second shift stage, include the gear shifts from the eighth shift stage to the seventh shift stage, the sixth shift stage, and the fifth shift stage. The short target torque phase time is set for the gear shift to the fifth shift stage among the gear shifts in which the progress of the gear shift is promoted, and the torque phase control is performed.

The above-mentioned operations are repeatedly performed at predetermined intervals.

FIG. 6 is a diagram illustrating an example of a change of the shift stage when a jump downshift via an intermediate shift stage is performed. "Gear shift patterns" in FIG. 6 indicate a shift stage before the gear shift, an intermediate shift stage, and a required shift stage through which the jump downshift progresses. A "first gear shift disengagement element" is a disengagement-side element (which is switched from engagement to disengagement) at the time of a gear shift from the shift stage before the gear shift to the intermediate shift stage. A "first gear shift engagement element" is an engagement-side element (which is switched from disengagement to engagement) at the time of a gear shift from the shift stage before the gear shift to the intermediate shift stage. A "shift stage which is realized in combination of two elements" is a shift stage which is set when the "first gear shift disengagement element" and the "first gear shift engagement element" are in the engaged state. "Nin increase determination" is determination of whether the input shaft rotation speed increases (a shift stage lower than the intermediate shift stage is set) by the "shift stage which is realized in combination of two elements."

As can be seen from FIG. 6, when the jump downshift from the sixth shift stage to the third shift stage is performed via the fourth shift stage as an intermediate shift stage, the second clutch C2 serves as the first gear shift disengagement element and the first clutch C1 serves as the first gear shift engagement element at the time of the gear shift from the sixth shift stage to the fourth shift stage. In this case, the shift stage which is set when the second clutch C2 and the first clutch C1 engage with each other is the fifth shift stage which is higher than the intermediate shift stage (the fourth shift stage). Accordingly, In the "Nin increase determination," it is determined that the input shaft rotation speed does not increase. Accordingly, in this case, the target torque phase time is set to be long ($\alpha$).

On the other hand, when the jump downshift from the eighth shift stage to the third shift stage is performed via the fifth shift stage as an intermediate shift stage, the first brake B1 serves as the first gear shift disengagement element and the first clutch C1 serves as the first gear shift engagement element at the time of the gear shift from the eighth shift stage to the fifth shift stage. In this case, the shift stage which is set when the first brake B1 and the first clutch C1 engage with each other is the second shift stage which is lower than the intermediate shift stage (the fifth shift stage). Accordingly, In the "Nin increase determination," it is determined that the input shaft rotation speed increases. Accordingly, in this case, the target torque phase time is set to be short ($\beta$).

The target torque phase time in a case in which the torque phase control is performed in Step ST4 and a case in which the torque phase control is performed in Step ST5 will be described below with reference to FIGS. 7 and 8.

Figure 7:
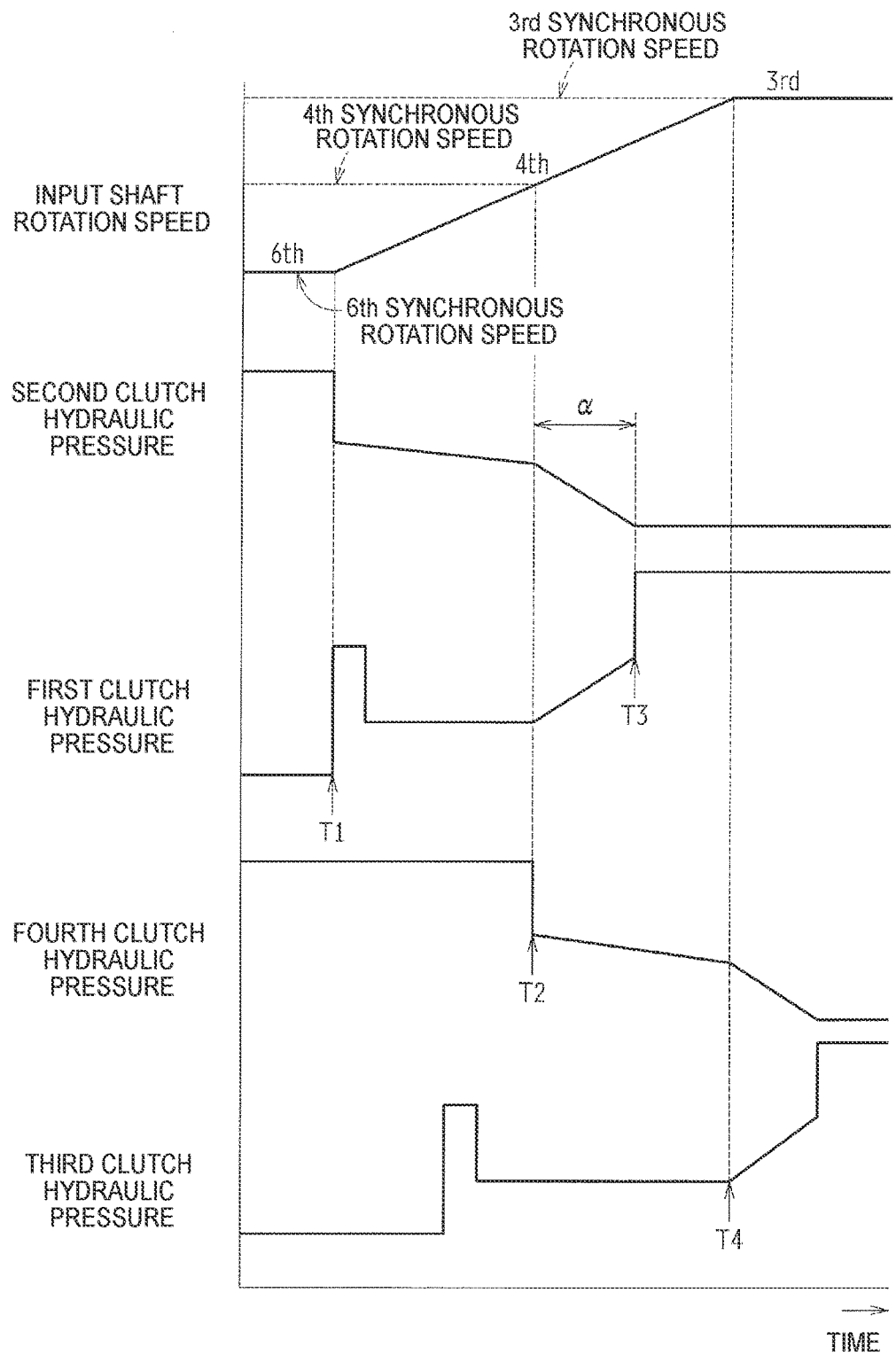
FIG. 7 is a timing chart illustrating changes of an input shaft rotation speed and hydraulic instruction values of frictional engagement elements at the time of a jump downshift from a sixth shift stage to a third shift stage using a fourth shift stage as an intermediate shift stage.

FIG. 7 is a timing chart illustrating changes of the input shaft rotation speed and the hydraulic instruction values of the frictional engagement elements at the time of a jump downshift from the sixth shift stage to the third shift stage using the fourth shift stage as an intermediate shift stage in the case in which the torque phase control is performed in Step ST4 (a case in which the disengagement-side element in the torque phase does not act to increase the input shaft rotation speed after the torque phase). FIG. 8 is a timing chart illustrating changes of the input shaft rotation speed and the hydraulic instruction values of the frictional engagement elements at the time of a jump downshift from the eighth shift stage to the third shift stage using the fifth shift stage as an intermediate shift stage in the case in which the torque phase control is performed in Step ST5 (a case in which the disengagement-side element in the torque phase acts to increase the input shaft rotation speed after the torque phase).

When the disengagement-side element in the torque phase does not act to increase the input shaft rotation speed after the torque phase, an operation of disengaging the second clutch C2 is started and fast filling which is preparation for engagement of the first clutch C1 is performed, at time T1 in FIG. 7. Thereafter, the hydraulic instruction value of the second clutch C2 decreases gradually and the input shaft rotation speed increases to the synchronous rotation speed of the fourth shift stage. The torque phase control in which the operation of disengaging the second clutch C2 and the operation of engaging the first clutch C1 are performed in parallel (replacement of the clutch is performed) is started at a time point (time T2) at which the input shaft rotation speed approaches the synchronous rotation speed of the fourth shift stage. The target torque phase time in which the torque phase control is performed is set to $\alpha$ (which is longer than $\beta$) based on a parameter (such as an accelerator depression amount or a vehicle speed) indicating a required driving force from a driver. That is, a period $\alpha$ from time T2 to time T3 in the drawing is set as the target torque phase time. At time T2, the hydraulic instruction value of the fourth clutch C4 decreases gradually and the input shaft rotation speed increases to the synchronous rotation speed of the third shift stage. The torque phase control in which the operation of disengaging the fourth clutch C4 and the operation of engaging the third clutch C3 are performed in parallel (replacement of the clutch is performed) is started at a time point (time T4) at which the input shaft rotation speed approaches the synchronous rotation speed of the third shift stage.

Figure 8:
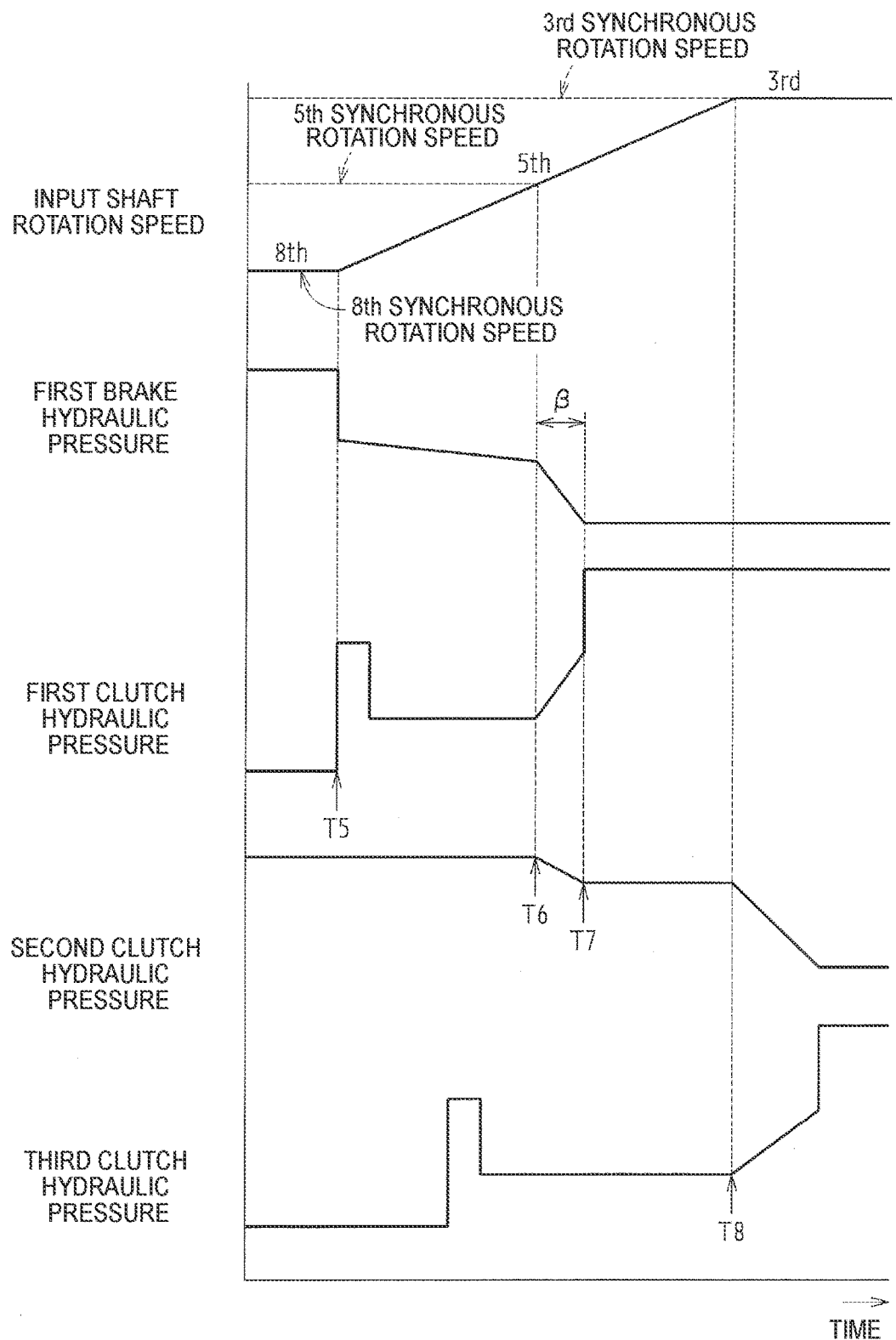
FIG. 8 is a timing chart illustrating changes of an input shaft rotation speed and hydraulic instruction values of frictional engagement elements at the time of a jump downshift from an eighth shift stage to a third shift stage using a fifth shift stage as an intermediate shift stage.

When the disengagement-side element in the torque phase acts to increase the input shaft rotation speed after the torque phase, an operation of disengaging the first brake B1 is started and fast filling which is preparation for engagement of the first clutch C1 is performed, at time T5 in FIG. 8. Thereafter, the hydraulic instruction value of the first brake B1 decreases gradually and the input shaft rotation speed increases to the synchronous rotation speed of the fifth shift stage. The torque phase control in which the operation of disengaging the first brake B1 and the operation of engaging the first clutch C1 are performed in parallel (replacement of the clutch is performed) is started at a time point (time T6) at which the input shaft rotation speed approaches the synchronous rotation speed of the fifth shift stage. The target torque phase time in which the torque phase control is performed is set to a time $\beta$ which is shorter than the target torque phase time $\alpha$. That is, a period $\beta$ from time T6 to time T7 in the drawing is set as the target torque phase time. Accordingly, disengagement of the first brake B1 is early performed. In the target torque phase time, the hydraulic instruction value of the second clutch C2 decreases. Accordingly, switching of the input clutch from the second clutch C2 to the first clutch C1 is early performed. That is, the switching time of the input clutch is shortened. The torque phase control in which the operation of disengaging the second clutch C2 and the operation of engaging the third clutch C3 are performed in parallel (replacement of the clutch is performed) is started at a time point (time T8) at which the input shaft rotation speed approaches the synchronous rotation speed of the third shift stage.

In this way, in this embodiment, the target torque phase time (a period from time T6 to time T7) at the time of passing through the intermediate shift stage when the disengagement-side element in the torque phase acts to increase the input shaft rotation speed after the torque phase is set to be shorter than the target torque phase time (a period from time T2 to time T3) at the time of passing through the intermediate shift stage when the disengagement-side element in the torque phase does not act to increase the input shaft rotation speed after the torque phase. Accordingly, when the disengagement-side element in the torque phase acts to increase the input shaft rotation speed after the torque phase, disengagement of the disengagement-side element at the time of passing through the intermediate shift stage can be early completed. It is possible to suppress a rapid increase of the input shaft rotation speed due to the clutch torque of the frictional engagement element remaining. As a result, it is possible to prevent degradation in driving force characteristics and to prevent degradation in drivability.

A modified example will be described below. In this modified example, the disclosure is applied to a transmission having a configuration different from that in the above-mentioned embodiment.

FIG. 9 is an engagement table illustrating engagement states of the first to fourth clutches, the first brake, and the second brake for each shift stage in an automatic transmission according to the modified example. As can be seen from FIG. 9, in the automatic transmission according to the modified example, each shift stage is set by causing three frictional engagement elements among a plurality of frictional engagement elements to engage with each other. An example of the configuration of the automatic transmission according to the modified example is disclosed in Japanese Patent Application Publication No. 2016-99000 (JP 2016-99000 A). The first clutch C1, the first brake B1, and the like in the automatic transmission having this configuration are examples of the frictional engagement element serving as the engagement maintaining element in the disclosure.

FIG. 10 is a diagram illustrating an example of a change in a shift stage when a jump downshift via an intermediate shift stage is performed in the automatic transmission according to the modified example. "Gear shift patterns" in FIG. 10 indicate a shift stage before the gear shift, an intermediate shift stage, and a required shift stage through which the jump downshift progresses. A "first gear shift disengagement element" is a disengagement-side element (which is switched from engagement to disengagement) at the time of a gear shift from the shift stage before the gear shift to the intermediate shift stage. A "first gear shift engagement element" is an engagement-side element (which is switched from disengagement to engagement) at the time of a gear shift from the shift stage before the gear shift to the intermediate shift stage. A "common clutch before and after passing through an intermediate shift stage" is a clutch or a brake which is maintained in the engaged state at the time of passing through the intermediate shift stage. A "shift stage which is realized in combination of three elements" is a shift stage which is set when the "first gear shift disengagement element," the "first gear shift engagement element," and the "common clutch before and after passing through the intermediate shift stage" are all in the engaged state. "Nin increase determination" is determination of whether the input shaft rotation speed increases (a shift stage lower than the intermediate shift stage is set) by the "shift stage which is realized in combination of three elements."

As can be seen from FIG. 10, when the jump downshift from the fifth shift stage to the second shift stage is performed via the third shift stage as an intermediate shift stage, the fourth clutch C4 serves as the first gear shift disengagement element, the second brake B2 serves as the first gear shift engagement element, and the first brake B1 serves as the common clutch before and after passing through the intermediate shift stage at the time of the gear shift from the fifth shift stage to the third shift stage. In this case, the shift stage which is set when the fourth clutch C4 and the brakes B2 and B1 are all in the engaged state is the fourth shift stage which is higher than the intermediate shift stage (the third shift stage). Accordingly, In the "Nin increase determination," it is determined that the input shaft rotation speed does not increase. Accordingly, in this case, the target torque phase time is set to be long ($\alpha$).

On the other hand, when the jump downshift from the ninth shift stage to the sixth shift stage is performed via the seventh shift stage as an intermediate shift stage, the first brake B1 serves as the first gear shift disengagement element, the fourth clutch C4 serves as the first gear shift engagement element, and the first clutch C1 serves as the common clutch before and after passing through the intermediate shift stage at the time of the gear shift from the ninth shift stage to the seventh shift stage. In this case, the shift stage which is set when the clutches C4 and C1 and the first brake B1 are all in the engaged state is the sixth shift stage which is lower than the intermediate shift stage (the seventh shift stage). Accordingly, In the "Nin increase determination," it is determined that the input shaft rotation speed increases. Accordingly, in this case, the target torque phase time is set to be short ($\beta$).

In the modified example, similarly to the above-mentioned embodiment, when the disengagement-side element in the torque phase acts to increase the input shaft rotation speed after the torque phase, the torque phase control is performed with the target torque phase time set to be shorter than that when the disengagement-side element in the torque phase does not act to increase the input shaft rotation speed after the torque phase. Accordingly, it is possible to complete disengagement of the disengagement-side element at the time of passing through the intermediate shift stage early and to suppress a rapid increase of the input shaft rotation speed due to the clutch torque of the frictional engagement element remaining.

The above-mentioned embodiment and the above-mentioned modified example are exemplary in all respects and do not serve as a basis of restrictive analysis. Therefore, the technical scope of the disclosure is not limited to only the above-mentioned embodiment, but is defined by the description of the appended disclosure. The technical scope of the disclosure includes all modifications within a meaning and a range equivalent to the disclosure.

The above-mentioned embodiment and modified example describe an example in which the vehicle 100 is of an FF type. However, the disclosure is not limited thereto and the vehicle may be of a front engine-rear drive (FR) type or of a four-wheel driven type.

The jump downshift via an intermediate shift stage which has been mentioned above includes an overlap gear shift in which a single downshift (a one-step downshift) is continuously performed in a broad sense.

The torque phase control according to the disclosure is not limited to a power-on downshift via an intermediate shift stage accompanied by input switching, but can be applied to a power-off upshift via an intermediate shift stage accompanied by input switching. In this case, when a predetermined shift stage which is set when the first frictional engagement element ad the second frictional engagement element engage with each other is a shift stage which is higher than the intermediate shift stage, the target torque phase time is set to be shorter than the target torque phase time which is set when the predetermined shift stage is a shift stage lower than the intermediate shift stage, and the torque phase control at the time of passing through the intermediate shift stage is performed. Accordingly, it is possible to suppress a rapid decrease of the input shaft rotation speed due to the clutch torque of the frictional engagement element remaining. For example, when a jump upshift from the third shift stage to the eighth shift stage using the fifth shift stage as an intermediate shift stage is performed and a hydraulic response delay of the third clutch C3 or the like occurs during the gear shift to the fifth shift stage, the shift stage which is set by causing the third clutch C3 and the second clutch C2 to engage with each other is the seventh shift stage which is higher than the fifth shift stage. Accordingly, there is concern that the input shaft rotation speed will decrease rapidly to the synchronous rotation speed of the seventh shift stage. In this case, the short target torque phase time (corresponding to β) is set and the torque phase control is performed. Accordingly, it is possible to complete disengagement of the disengagement-side element at the time of passing through the intermediate shift stage early. It is possible to suppress a rapid decrease of the input shaft rotation speed due to the clutch torque of the frictional engagement element remaining.

In the above-mentioned embodiment, the target torque phase time is set to be long (α) in the jump downshift from the sixth shift stage to the third shift stage using the fourth shift stage as the intermediate shift stage, and the target torque phase time is set to be short (β) in the jump downshift from the eighth shift stage to the third shift stage using the fifth shift stage as the intermediate shift stage. As another gear shifts, in a jump downshift from the sixth shift stage to the fourth shift stage using the fifth shift stage as the intermediate shift stage, the disengagement-side element in the torque phase at the time of passing through the intermediate shift stage acts to increase the input shaft rotation speed after the torque phase. In this case, a degree of increase of the input shaft rotation speed is relatively small and thus the target torque phase time may be set to be long (α).

An example in which the torque phase control execution time is determined by the target torque phase time has been described above, but the torque phase control execution time may be determined by setting a gradient of the hydraulic instruction value at the time of replacing the clutch.

The disclosure can be used for a controller for a stepped-type automatic transmission which is mounted in a vehicle and which can perform a jump gear shift via an intermediate shift stage.

What is claimed is:

1. A control device applied to a stepped type automatic transmission including a plurality of frictional elements including an input frictional element that transmits power from a driving force source to a gear shift unit, the automatic transmission establishing one of a plurality of shift stages by selectively engaging two or more of the plurality of frictional elements with each other, and when a gear shift is required for a shift stage difference of two or more stages between a current shift stage and a target shift stage in a first shift direction, the automatic transmission performs the gear shift via an intermediate shift stage, the control device comprising:
   a processor configured to, when performing the gear shift via the intermediate shift stage requires switching the input frictional element, control the transmission to:
   (a) shift from the current shift stage to the intermediate shift stage by:
      (a1) disengaging a first frictional element from a second frictional element; and
      (a2) engaging the second frictional element to a third frictional element;
   (b) shift from the intermediate shift stage to the target shift stage;
   (c) when a second shift direction, which is from the intermediate shift stage to a first shift stage associated with engagement between the first frictional element and the input frictional element in the target shift stage, is different from the first shift direction, perform (a) and (b) in a first time period; and
   (d) when the first shift direction is the same as the second shift direction, perform (a) and (b) in a second time period shorter than the first time period.

2. The control device of claim 1, wherein the gear shift from the current shift stage to the target shift stage is a power-on downshift, and the processor is configured to control the transmission to perform (c) and (d) as follows:
   (c) when the first shift stage is not lower than the intermediate shift stage, perform (a) and (b) in the first time period; and
   (d) when the first shift stage is lower than the intermediate shift stage, perform (a) and (b) in the second time period shorter than the first time period.

3. The control device of claim 1, wherein the gear shift from the current shift stage to the target shift stage is a power-off upshift, and the processor is configured to control the transmission to perform (c) and (d) as follows:
   (c) when the first shift stage is not higher than the intermediate shift stage, perform (a) and (b) in the first time period; and
   (d) when the first shift stage is higher than the intermediate shift stage, perform (a) and (b) in the second time period shorter than the first time period.

4. The control device of claim 1, wherein the first time period and second time period are set in advance by the processor as target times for performing (a) and (b).

* * * * *